(12) United States Patent
Fischer et al.

(10) Patent No.: US 8,944,462 B2
(45) Date of Patent: Feb. 3, 2015

(54) AIR BAG WITH UNINFLATED POCKET

(75) Inventors: Kurt F. Fischer, Leonard, MI (US);
Daniele Aranzulla, Essingen (DE);
Martin Burkhardtsmaier, Schwaebisch Gmund (DE)

(73) Assignee: TRW Vehicle Safety Systems Inc., Washington, MI (US)

( * ) Notice: Subject to any disclaimer, the term of this patent is extended or adjusted under 35 U.S.C. 154(b) by 451 days.

(21) Appl. No.: 13/087,473

(22) Filed: Apr. 15, 2011

(65) Prior Publication Data
US 2012/0261910 A1    Oct. 18, 2012

(51) Int. Cl.
*B60R 21/231*    (2011.01)
*B60R 21/205*    (2011.01)
*B60R 21/235*    (2006.01)
*B60R 21/2338*   (2011.01)

(52) U.S. Cl.
CPC ............ *B60R 21/205* (2013.01); *B60R 21/231* (2013.01); *B60R 21/235* (2013.01); *B60R 2021/23382* (2013.01)
USPC ...................... 280/743.1; 280/732; 280/743.2

(58) Field of Classification Search
USPC .................................... 280/732, 743.1, 743.2
See application file for complete search history.

(56) References Cited

U.S. PATENT DOCUMENTS

| | | | | |
|---|---|---|---|---|
| 6,616,184 B2 * | 9/2003 | Fischer | .................. | 280/743.2 |
| 6,846,008 B2 * | 1/2005 | Kamiji et al. | .............. | 280/729 |
| 7,152,880 B1 * | 12/2006 | Pang et al. | ............... | 280/743.2 |
| 7,350,807 B2 * | 4/2008 | Schneider et al. | ............ | 280/732 |
| 7,594,678 B2 * | 9/2009 | Schedler | .................... | 280/743.2 |
| 7,607,683 B2 * | 10/2009 | Fischer et al. | .............. | 280/730.1 |
| 7,625,008 B2 * | 12/2009 | Pang et al. | .................. | 280/743.1 |
| 7,648,158 B2 * | 1/2010 | Hasebe | ....................... | 280/729 |
| 7,695,012 B2 | 4/2010 | Libby et al. | | |
| 7,946,619 B2 * | 5/2011 | Mendez | ..................... | 280/743.1 |
| 7,980,592 B2 * | 7/2011 | Fischer et al. | ............. | 280/743.1 |
| 8,152,199 B2 * | 4/2012 | Bauer et al. | .................. | 280/739 |
| 8,282,129 B2 * | 10/2012 | Choi | ........................ | 280/743.1 |
| 8,651,523 B2 * | 2/2014 | Miyata | ..................... | 280/743.1 |
| 8,757,656 B2 * | 6/2014 | Miyata | ......................... | 280/729 |
| 2002/0063416 A1 * | 5/2002 | Kamaiji et al. | ............. | 280/728.2 |
| 2004/0245751 A1 * | 12/2004 | Marotzke et al. | ............. | 280/731 |
| 2006/0103118 A1 * | 5/2006 | Hasebe | ........................ | 280/729 |
| 2006/0138761 A1 * | 6/2006 | Kumagai et al. | ........... | 280/743.1 |
| 2006/0249934 A1 * | 11/2006 | Hasebe | ........................ | 280/729 |
| 2007/0108750 A1 * | 5/2007 | Bauer et al. | .................. | 280/740 |
| 2007/0108753 A1 * | 5/2007 | Pang et al. | .................. | 280/743.2 |
| 2008/0007036 A1 * | 1/2008 | Furuno et al. | .............. | 280/743.1 |
| 2009/0194981 A1 * | 8/2009 | Mendez | ....................... | 280/732 |

(Continued)

*Primary Examiner* — Paul N Dickson
*Assistant Examiner* — Barry Gooden, Jr.
(74) *Attorney, Agent, or Firm* — Tarolli, Sundheim, Covell & Tummino LLP

(57) ABSTRACT

An inflatable vehicle occupant protection device (14) for being inflated between an instrument panel (36) and a seat (22) of the vehicle (12) is provided. The protection device (14) includes a front portion (70) that has a panel (72) presented towards the vehicle seat (22), a rear portion (76) adjacent the instrument panel (36), and top and bottom portions (90, 92) interconnecting the front portion (70) and the rear portion (76) to define an inflatable volume (54). A pocket (100) defines an uninflated volume (102) outside of the inflatable volume (54). The pocket (100) is defined by a single panel (160) of the protection device (14). The panel (100) extends along a centerline (162) and includes an extension (180) of material on each side of the centerline (162). The extensions (180) overly one another and are interconnected along a seam (106) to form the pocket (100).

11 Claims, 14 Drawing Sheets

(56) References Cited

U.S. PATENT DOCUMENTS

| | | |
|---|---|---|
| 2009/0250912 A1 | 10/2009 | Libby et al. |
| 2010/0007124 A1* | 1/2010 | Fischer et al. ............ 280/743.1 |
| 2010/0102542 A1* | 4/2010 | Nakajima et al. .......... 280/743.2 |
| 2010/0225095 A1* | 9/2010 | Smith et al. ................... 280/729 |
| 2011/0079988 A1* | 4/2011 | Bauer et al. ................ 280/728.1 |

* cited by examiner

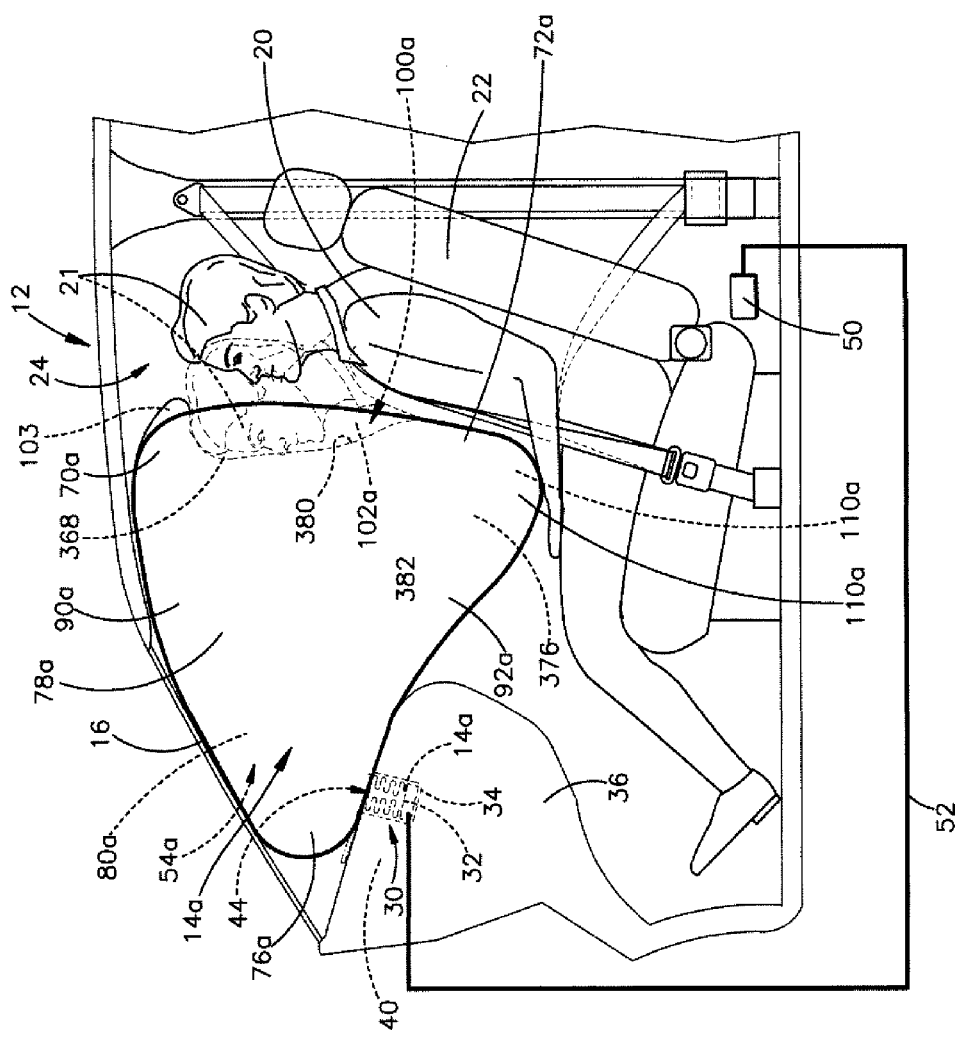

AIR BAG WITH UNINFLATED POCKET

FIELD OF THE INVENTION

The present invention relates to an apparatus for helping to protect an occupant of a vehicle. More particularly, the present invention relates to an air bag inflatable between an instrument panel and a front seat occupant of a vehicle.

BACKGROUND OF THE INVENTION

It is known to provide an inflatable vehicle occupant protection device, such as an air bag, for helping to protect an occupant of a vehicle. One particular type of air bag is a frontal air bag inflatable between an occupant of a front seat of the vehicle and an instrument panel of the vehicle. Such air bags may be driver air bags or passenger air bags. When inflated, the driver and passenger air bags help protect the occupant from impacts with parts of the vehicle such as the instrument panel and/or a steering wheel of the vehicle.

Passenger air bags are typically stored in a deflated condition in a housing that is mounted to the vehicle instrument panel. An air bag door is connectable with the housing and/or instrument panel to help enclose and conceal the air bag in a stored condition. Upon deployment of the passenger air bag, the air bag door opens to permit the air bag to move to an inflated position. The air bag door opens as a result of forces exerted on the door by the inflating air bag.

The position of the occupant in the vehicle seat may dictate how the air bag is configured in order to more adequately protect the occupant during vehicle crashes. For instance, it may be desirable to protect the occupant from striking or being struck by the deploying air bag with high impact forces. Such is the case when the occupant is unbelted and, thus, is positioned closer to the instrument panel during air bag deployment than a belted occupant. Rearward facing car seats that carry infants are also positioned on the vehicle seat in a position where an air bag is likely to deploy.

SUMMARY OF THE INVENTION

In accordance with an embodiment of the present invention, an inflatable vehicle occupant protection device for being inflated between an instrument panel and a seat of the vehicle is provided. The protection device includes a front portion that has a panel presented towards the vehicle seat, a rear portion adjacent the instrument panel, and top and bottom portions interconnecting the front portion and the rear portion to define an inflatable volume. A pocket defines an uninflated volume outside of the inflatable volume. The pocket is defined by a single panel of the protection device. The panel extends along a centerline and includes an extension of material on each side of the centerline. The extensions overly one another and are interconnected along a seam to form the pocket.

In accordance with another embodiment of the present invention, an inflatable vehicle occupant protection device for being inflated between an occupant of the vehicle and an instrument panel of the vehicle is provided. The protection device includes a first panel that extends along a centerline and has a first peripheral edge and a second peripheral edge. The first panel includes an extension on each side of the centerline. A second panel has a peripheral edge interconnected with the first peripheral edge of the first panel along a seam to define an inflatable volume between the first panel and the second panel. The extensions of the first panel overly one another and are interconnected along a seam to define an uninflated volume outside of the inflatable volume. The first and second panels are interconnected to define a front portion that has a front panel presented towards the vehicle occupant, a rear portion adjacent the instrument panel, and top and bottom portions interconnecting the front portion and the rear portion to define an inflatable volume. A pocket defines an uninflated volume outside of the inflatable volume. The extensions of the first panel overly one another and are interconnected along a seam to form the pocket. When the protection device is inflated the pocket has a first material tension and the remainder of the protection device has a second, higher material tension.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 15 is a schematic side view illustrating the apparatus of FIG. 10 in which a tether is omitted.

DETAILED DESCRIPTION OF THE INVENTION

Figure 1:
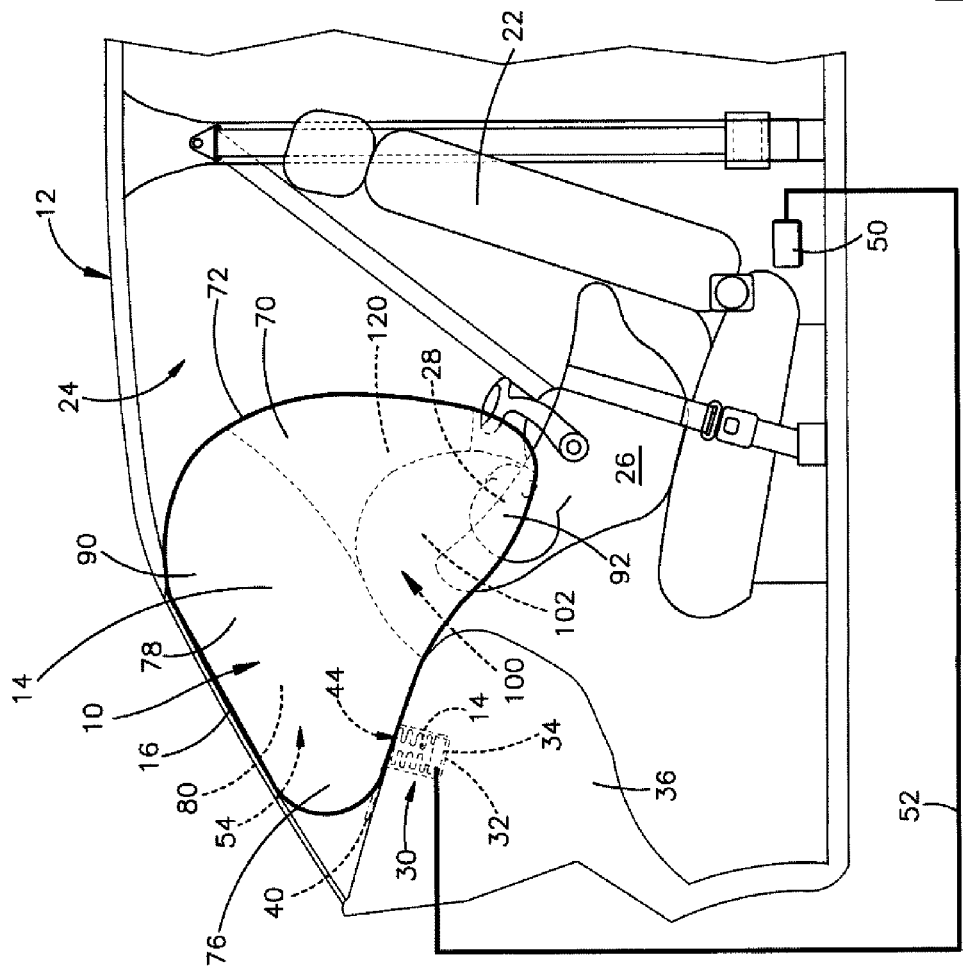
FIG. 1 is a schematic side view illustrating an apparatus for helping to protect an occupant of a vehicle an air bag having an uninflated pocket in accordance with an embodiment of the present invention.

An apparatus 10 for helping to protect an occupant 20 of a vehicle 12 includes an inflatable vehicle occupant protection device 14 in the form of an air bag. In the embodiment illustrated in FIG. 1, the air bag 14 is a passenger frontal air bag that minimizes interaction with an infant 28 within a car seat 26 on a passenger side 24 of the vehicle 12 during inflation. Those skilled in the art will appreciate that the apparatus 10 disclosed herein could be adapted for car seats 26 in rearward rows of the vehicle 12, such as a 2$^{nd}$ row, 3$^{rd}$ row, etc., of the vehicle (not shown).

The air bag 14 may be part of an air bag module 30 that includes an inflator 32 and a housing 34. The air bag 14 has a stored condition, indicated by dashed lines in FIG. 1, in which the air bag is folded and placed in the housing 34. The module 30 is mounted to a dash or instrument panel 36 of the vehicle 12. The housing 34 helps contain and support the air bag 14 and inflator 32 in the instrument panel 36.

An air bag door 40 is releasably connected to the instrument panel 36 and/or the housing 34. In a closed condition (not shown), the air bag door 40 forms a cover for the module 30 and helps enclose the air bag 14 in the stored condition in the housing 34. The door 40 is movable to an opened condition illustrated in FIG. 1 to uncover an opening 44 through which the air bag 14 may be deployed from the stored condition in the housing 34. The door 40 may be connected to the vehicle 12, e.g., the instrument panel 36, either directly or through the housing 34, by means (not shown), such as a plastic hinge portion, a strap or a tether.

The inflator 32 is actuatable to provide inflation fluid to an inflatable volume 54 of the air bag 14 to deploy the air bag to the inflated condition. The inflator 32 may be of any known type, such as stored gas, solid propellant, augmented, or hybrid. The apparatus 10 includes a sensor, illustrated schematically at 50, for sensing an event for which inflation of the air bag 14 is desired, such as a collision. The inflator 32 is operatively connected to the sensor 50 via lead wires 52.

The air bag 14 can be constructed of any suitable material, such as nylon (e.g., woven nylon 6-6 yarns), and may be constructed in any suitable manner. For example, the air bag 14 may include one or more pieces or panels of material. If more than one piece or panel is used, the pieces or panels may be interconnected by known means, such as sewing, stitching, ultrasonic welding, heat bonding, or adhesives, to form the air bag. The air bag 14 may be uncoated, coated with a material, such as a gas impermeable urethane or laminated with a material, such as a gas impermeable film. The air bag 14 thus may have a gas-tight or substantially gas-tight construction. Those skilled in the art will appreciate that alternative materials, such as polyester yarn, and alternatives coatings, such as silicone, may also be used to construct the air bag 14.

In the embodiment of FIG. 1, the inflated air bag 14 deploys from the instrument panel 36 in an aft direction toward the vehicle seat 22. The air bag 14 includes a front portion 70 and a rear portion 76. In the deployed condition, the front portion 70 is spaced from the instrument panel 36 and includes a front panel 72 that is presented towards the vehicle seat 22. The rear portion 76 is positioned adjacent the windshield 16 and instrument panel 36 and occupies a substantial portion of the space between the windshield and the instrument panel. Lateral portions 78, 80 extend from the front portion 70 to the rear portion 76. The lateral portion 78 is positioned on the inboard side of the vehicle 12 and the lateral portion 80 is positioned on the outboard side of the vehicle. The lateral portions 78, 80 may extend substantially parallel to one another.

A top portion 90 is positioned adjacent to the windshield 16 and extends from the rear portion 76 to the front portion 70. A bottom portion 92 is positioned adjacent to the car seat 26 and extends from the rear portion 76 to the front portion 70. Collectively, the front portion 70, rear portion 76, lateral portions 78, 80, top portion 90, and bottom portion 92 define the inflatable volume 54 of the air bag 14.

Figure 4:
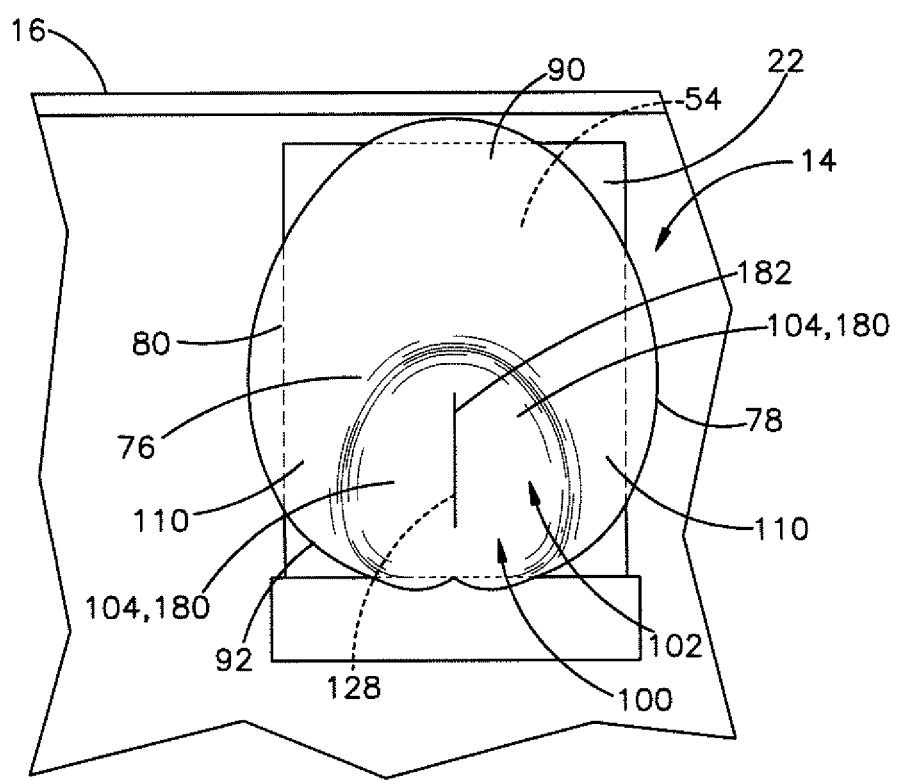
FIG. 4 is a rear view of the air bag of FIG. 1.

The air bag 14 includes a pocket 100 that is inverted to define an uninflated volume 102 positioned outside of the inflatable volume 54. The inverted pocket 100 extends in a fore-aft direction of the vehicle 12 from the rear portion 76 of the air bag 14 towards the front portion 70 and may terminate prior to the front portion. As best shown in FIG. 4, the inverted pocket 100 divides the bottom portion 92 of the air bag 14 into a pair of inflatable lobes 110 positioned on opposite sides of the pocket. Alternatively, the inverted pocket 100 may extend through the entire air bag 14a from the rear portion 76 to the front portion 70 (not shown) or may be positioned entirely within the front portion, terminating prior to the rear portion (not shown).

A flexible elongated member, such as a tether 120, interconnects portions of the air bag 14 to help maintain the pocket 100 in an inverted condition during inflation of the air bag 14. The tether 120 acts on the pocket 100 such that the size of the uninflated volume 102 defined by the inverted pocket remains substantially constant during inflation of the air bag 14. Additionally or alternatively, the tether 120 may act on the inverted pocket 100 to help maintain the uninflated volume 102 at or above a predetermined volume when the air bag 14 inflates. Although a single tether 120 is illustrated in FIG. 1 for maintaining the pocket 100 in an inverted condition during deployment of the air bag 14, more or fewer tethers may be used to connect one or more portions of the pocket with one or more portions 70, 72, 76, 78, 80, 90, 92 of the air bag.

Figure 5:
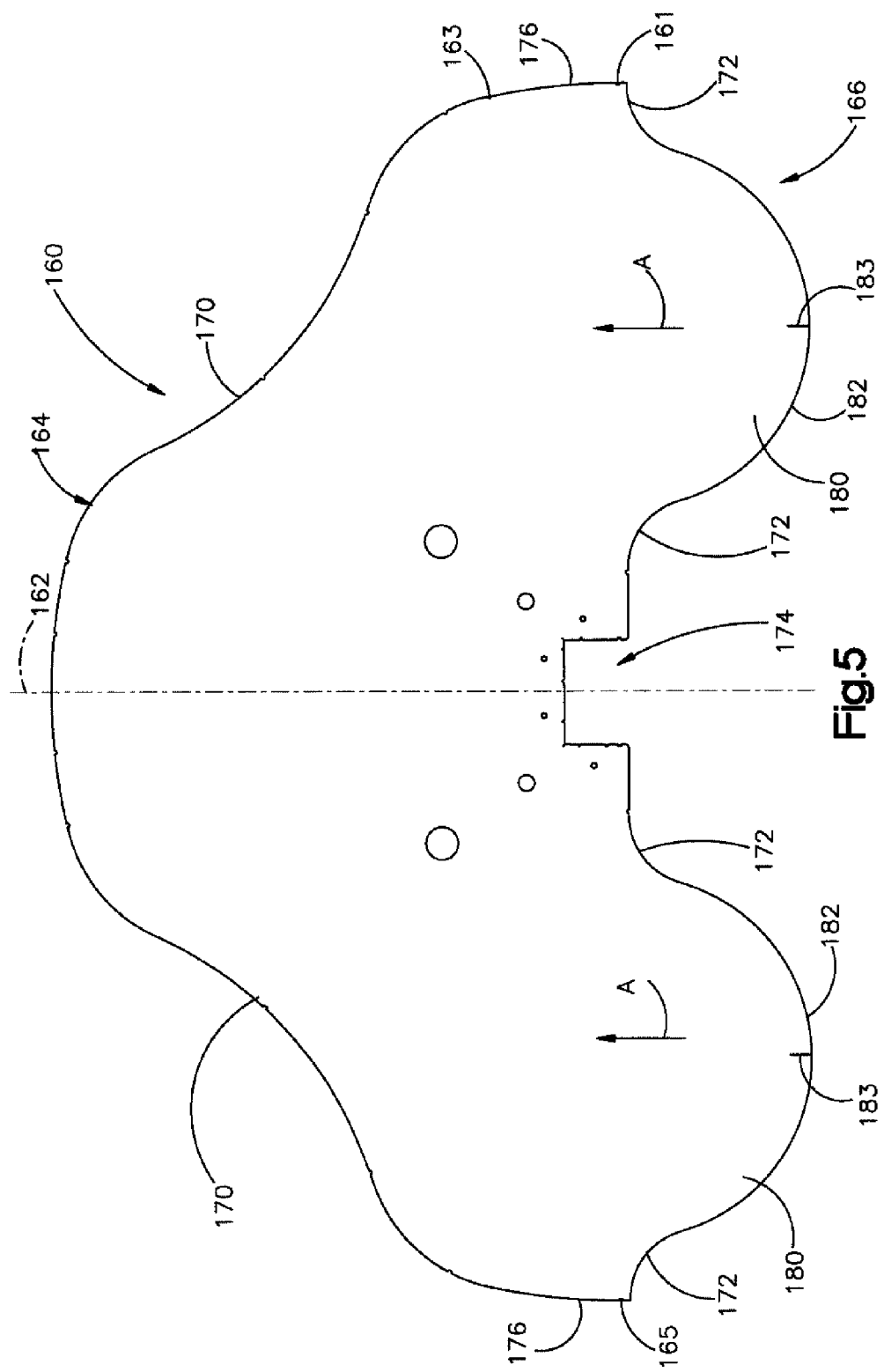
FIG. 5 is a schematic illustration of a main panel for constructing the air bag of FIG. 1.
Figure 6:
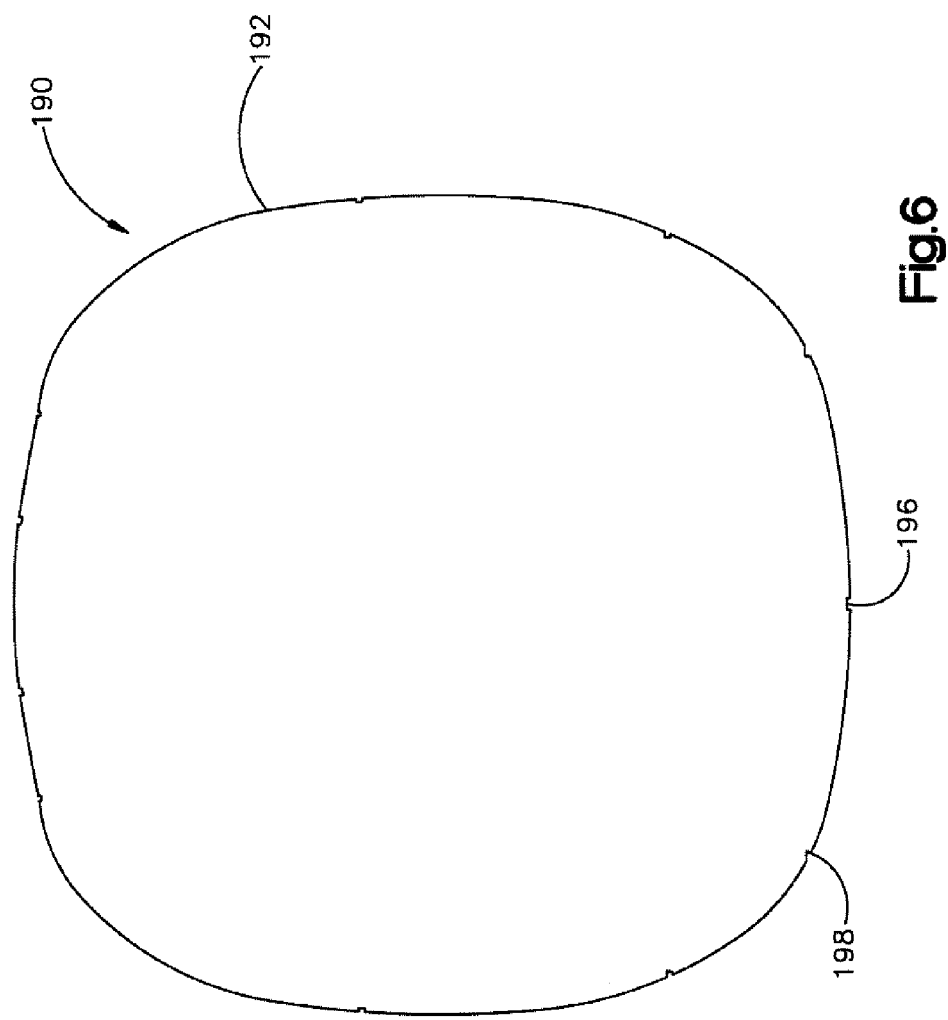
FIG. 6 is a schematic illustration of a front panel for constructing the air bag of FIG. 1.
Figure 7:
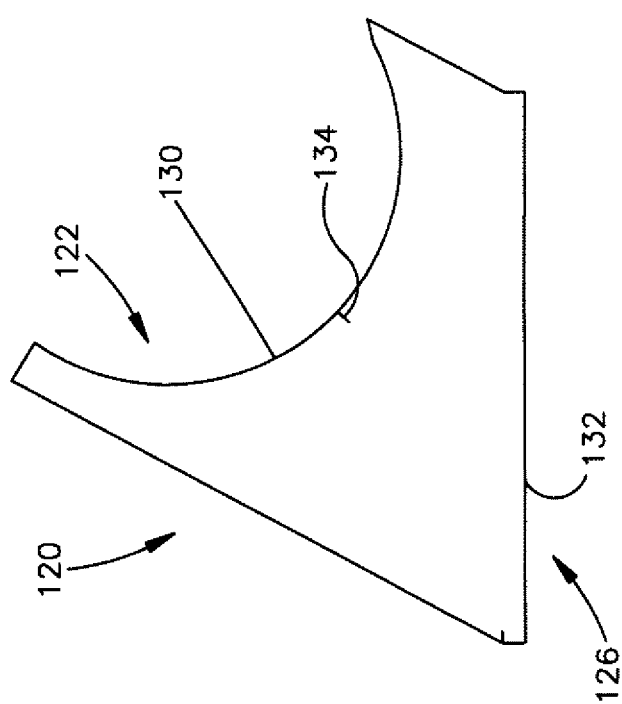
FIG. 7 is a schematic illustration of a panel for a tether for the air bag of FIG. 1.

FIGS. 5-7 illustrate plan views of component parts used to construct the air bag 14 in accordance with an embodiment of the present invention. The component parts of the air bag 14 include a main panel 160, a front panel 190, and a tether 120. As shown in FIG. 5, the main panel 160 may be formed as one piece of material and extends along a centerline 162 from a first end portion 164 to a second end portion 166. The main panel 160 includes a first peripheral edge 170 and a second peripheral edge 172 connected to the first peripheral edge. The first and second peripheral edges 170, 172 are symmetric about the centerline 162. The main panel 160 may also include various openings 174 for accommodating connection with the air bag module 30, e.g., the housing 34 and/or the inflator 32.

The first and second peripheral edges 170, 172 include a series of notches for helping to assemble the air bag 14. The first peripheral edge 170 includes a first notch 161 adjacent one end of the second peripheral edge 172, a second notch 163, and a final notch 165 adjacent the other end of the second peripheral edge. A series of notches are arranged between the second notch 163 and the final notch 165 but are omitted for brevity.

One or more extensions 180 of material extend from the second peripheral edge 172 and away from the first peripheral edge 170. Each extension 180 includes an edge 182 and has an arcuate or semicircular contour. The extensions 180 are symmetrically positioned on opposing sides of the centerline 162. The extensions 180 may be spaced from one another relative to the centerline 162 or may intersect at the centerline (not shown). In any case, the extensions 180 define portions of the air bag 14 used to form the pocket 100 that is inverted to define the uninflated volume 102.

As shown in FIG. 6, the front panel 190 may be formed from one piece of material and has a round shape defined by a peripheral edge 192. The front panel 190 forms the front panel 72 of the front portion 70 of the air bag 14 and cooperates with the main panel 160 to form the inflatable volume 54 of the air bag. The peripheral edge 192 includes a first notch 196 and second notch 198 for helping to secure the front panel 190 to the main panel 160.

As shown in FIG. 7, the tether 120 may be formed as a one piece panel of material having a first end portion 122 and a second end portion 126. The first end portion 122 includes an edge 130 and the second end portion 126 includes an edge 132. Although the tether 120 is illustrated as having a substantially triangular shape, alternative shapes such as square, rectangular, arcuate, etc. may also be used. Furthermore, the tether 120 may have a first end portion 122 and/or a second end portion 126 that has more than one portion for securing the first end portion and/or the second to multiple portions of the pocket 100 and/or the remainder of the air bag 14 (not shown).

To assemble the air bag 14, the main panel 160 is folded in half about the centerline 162 such that one half, e.g., the left side as viewed in FIG. 5, of the main panel overlies the other half, e.g., the right side as viewed in FIG. 5. This aligns the first notch 161 with the final notch 165. The edges 182 of the extensions 180 overlying one another are secured together along a seam 106 to form the pocket 100. The seam 106 may be formed by known means, such as stitching, ultrasonic welding, heat bonding, adhesives, etc.

Next, the first notch 196 and second notch 198 on the front panel 190 are aligned with the aligned notches 161, 165 and the second notch 163, respectively, of the main panel 160. A seam 194 then secures the entire first peripheral edge 170 of the main panel 160 to the entire peripheral edge 192 of the front panel 190.

Securing the connecting portions 176 together and the first peripheral edge 170 of the main panel 160 to the peripheral edge 192 of the front panel 190 forms and defines the front portion 70, the lateral portions 78, 80, the top portion 90, and the bottom portion 92 of the air bag 14 (see FIG. 1). The folded over main panel 160 and the front panel 190 in combination define the inflatable volume 54 of the air bag 14.

To invert the pocket 100, the interconnected extensions 180 are inverted into the inflatable volume 54 of the air bag 14. More specifically, the edges 182 of the extensions 180 are moved in a direction, indicated generally by the arrow labeled A in FIG. 5, towards the first end portion 164 of the main panel 160 until the interconnected extensions become concave. This places the pocket 100 in an inverted condition positioned between the first peripheral edge 170 and the second peripheral edge 172 of the main panel 160.

Figure 2:
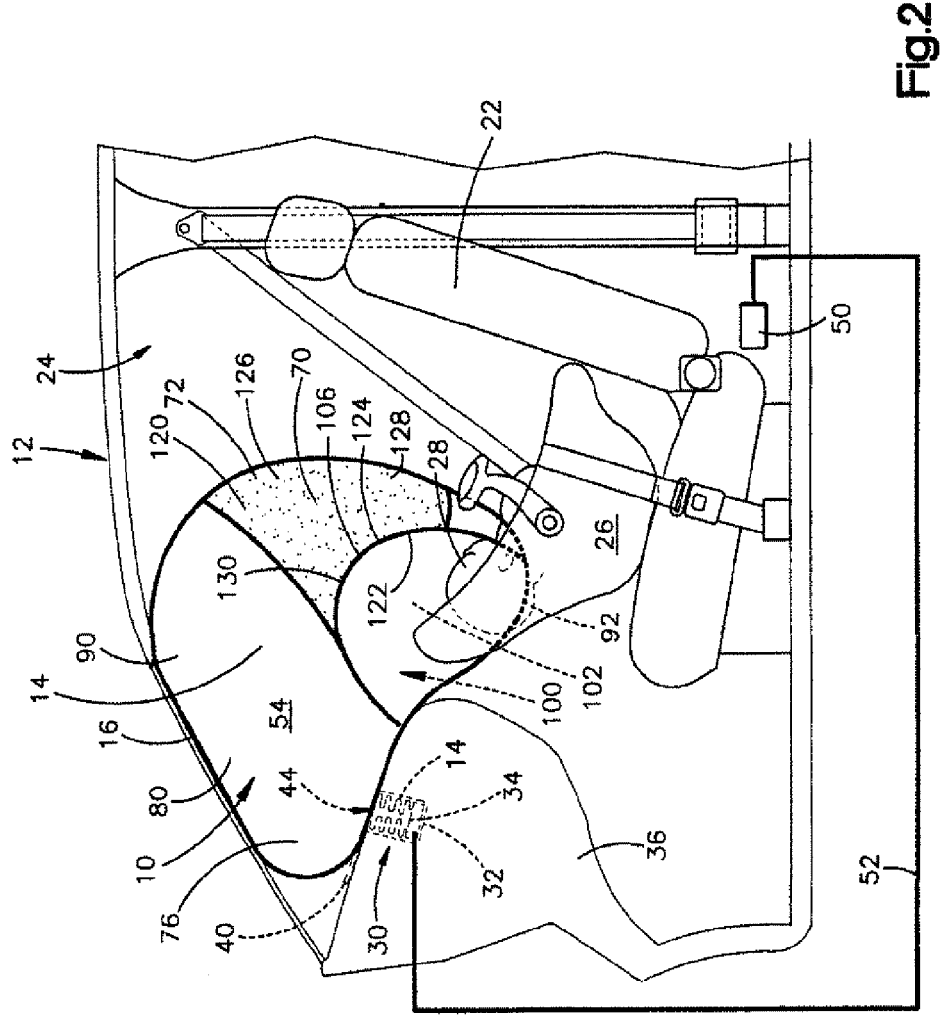
FIG. 2 is a side sectional view of FIG. 1.
Figure 3:
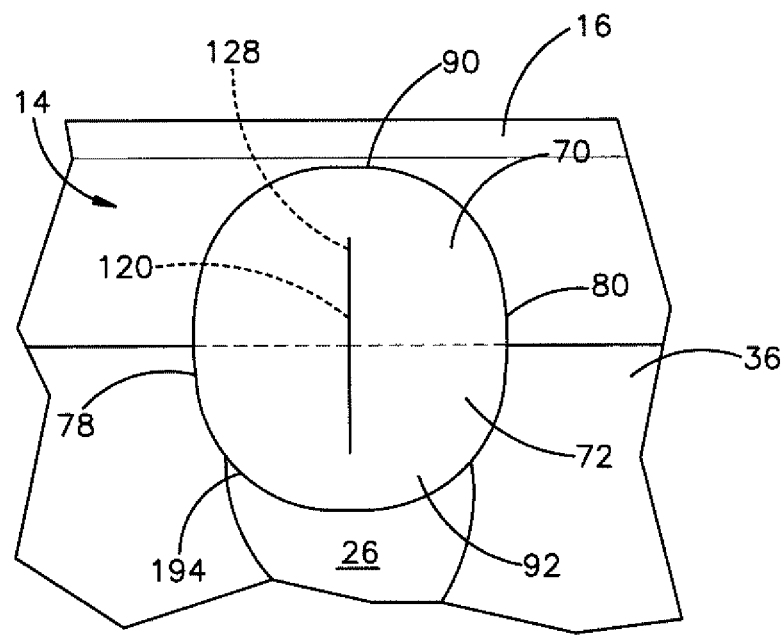
FIG. 3 is a front view of the air bag of FIG. 1.

Referring to FIG. 2, the edge 130 of the first end portion 122 of the tether 120 is secured along a seam 124 to the peripheral edge 182 of the pocket 100. An alignment marker 134 along the edge 130 is aligned with alignment markers 183 on the peripheral edge 182 to help properly position the tether 120 on the main panel 160. The edge 132 of the second end portion 126 of the tether 120 is secured along a seam 126 to a portion of the air bag 14. The tether 120 may, for example, extend between the pocket 100 and the front panel 190 of the air bag 14.

Upon sensing the occurrence of an event for which inflation of the air bag 14 is desired, such as a vehicle collision, the sensor 50 provides a signal to the inflator 32 via the lead wires 52. Upon receiving the signal from the sensor 50, the inflator 32 is actuated and provides inflation fluid to the inflatable volume 54 of the air bag 14 in a known manner. The inflating air bag 14 exerts a force on the door 40, which moves the door to the opened condition. The air bag 14 inflates from the stored condition to a deployed condition, such as the fully inflated, deployed, and pressurized condition illustrated in solid lines in FIG. 1. The air bag 14, when inflated, is configured to have minimal interaction with the infant 28 within the car seat 26

In the fully inflated condition shown in FIG. 1, the front portion 70 of the air bag 14 is presented away from the instrument panel 36 and the front panel 72 is presented facing the vehicle seat 22. The top portion 90 extends along windshield 16 and occupies the space between the windshield and the instrument panel 36. The bottom portion 92 extends along the instrument panel 36 and projects from the instrument panel toward the vehicle seat 22. The inverted pocket 100 in the bottom portion 92 of the air bag 14 is positioned between the front portion 72 of the air bag 14 and the instrument panel 36. The position of the inverted pocket 100 when the air bag 14 is inflated is configured to correspond with the likely or expected position of the infant 28 within the car seat 26. More specifically, the inverted pocket 100 is configured to deploy around the infant 28 in the car seat 26, thereby placing the infant and/or the child car seat or a portion thereof within the uninflated volume 102 and between the inflated lobes 110.

Due to the configuration of the pocket 100 and, more specifically the extra material provided by the extensions 180 of the main panel 160, the lobes 110 may have regions of reduced material tension in the area of the pocket relative to the remaining portions of the air bag 14. In typical, substantially spherical air bags, the internal pressure of the inflation gas is equally distributed along the air bag walls. Given a uniform pressure and material thickness, the stress on the air bag wall is directly related to the radius of curvature of the air bag, i.e., the larger the radius of curvature the greater the stress on the air bag wall. Since a substantially spherical air bag construction has a constant radius of curvature, the stress upon the spherical air bag walls is constant and, thus, the material tension is constant throughout the air bag.

On the other hand, the pocket 100 of the present invention forms a portion of the air bag 14 that has a smaller radius of curvature than the rest of the air bag. Therefore, the stress is unevenly distributed between the smaller pocket 100 and the larger remainder of the air bag 14. Accordingly, the fabric forming the pocket 100, i.e., the extension 180, experiences reduced stress and, thus, reduced material tension, relative to the fabric forming the rest of the inflated air bag 14.

The reduced tension in the area of the pocket 100 thereby advantageously may help reduce the magnitude of impact forces with those areas during deployment. This reduced tension in the area of the pocket 100 may help provide a reduced resistance to air bag penetration relative to the remainder of the inflated air bag 14. Those skilled in the art will appreciate that the material tension in the area of the pocket 100 and, thus, the level of resistance to penetration of the pocket when the air bag 14 is inflated can be tailored or adjusted by altering the size and shape of the extensions 180 in the main panel 160 and/or of the tether 120 to adjust the radius of curvature of the pocket.

As the air bag 14 deploys toward the seat 22, the second end portion 126 of the tether 120, being secured to the front panel 72, moves away from the instrument panel and toward the seat. Since the first end portion 122 of the tether 120 is secured to the pocket 100, the tether provides resistance to movement of the pocket out of the inverted condition shown in FIGS. 1-2 and thus helps maintain the size, position, and orientation of the pocket. Therefore, the tether 120 helps to ensure that the pocket 100 is maintained in the desired position relative to the vehicle seat 22 and to an infant 28/car seat 26 that may be positioned on the vehicle seat. Advantageously, the tether 120 can help to ensure that the areas of the air bag 14 in the area of the pocket 100 have a reduced resistance to penetration and thereby can produce softer impact forces with the air bag during deployment.

The simplicity of the construction of the air bag facilitates manufacturing by reducing assembly time and material cost. Furthermore, the simple, three panel 120, 160, 190 construction of the air bag 14 reduces the number of connections in the air bag and, thus, reduces the likelihood of the air bag leaking during inflation.

Although the air bag 14 of the present invention has been described as having a particular construction, those skilled in the art will appreciate that modifications to the air bag can be made without deviating from the spirit of the invention. The size, shape, and configuration of each extension 180 may be configured to form a pocket 100 and, thus, a particular uninflated volume 102 that has a particular configuration, e.g., size, shape, and orientation, in order to meet desired performance criteria. For example, the tether 120 may be configured such that the second end portion 126 of the tether can be secured to any one or more portions 70, 72, 76, 78, 80, 90, 92 of the air bag 14. In particular, the tether 120 may have a pair of second end portions 126 that are secured to the lateral portions 78, 80 of the air bag 14 (not shown). The tether 120 may also exhibit alternative shapes other than triangular, such as square, rectangular, arcuate, etc. Regardless of whether the air bag 14 includes a tether 120, the extensions 180 may be configured to exhibit a shape other than arcuate such as square, triangular, rectangular or the like.

Figure 8:
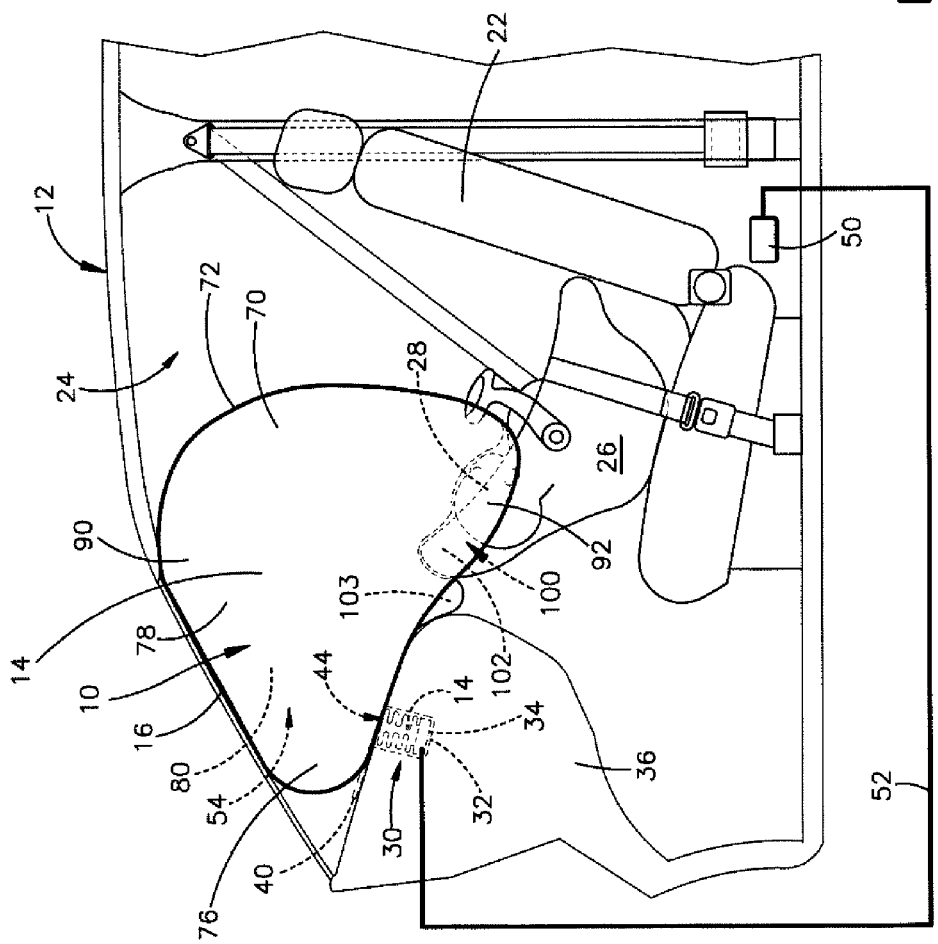
FIG. 8 is a schematic side view illustrating the apparatus of FIG. 1 in which a tether is omitted.

FIG. 8 illustrates an alternative construction of the air bag 14 in which the tether 120 is omitted. In this configuration, the main panel 160 and the front panel 190 are secured together in the manner described. The pocket 100 formed by interconnecting the extensions 180 on the main panel 160 is then inverted to place the pocket in an inverted condition positioned between the first peripheral edge 170 and the second peripheral edge 172 of the main panel. The air bag 14 is then stored with the untethered pocket 100 in the inverted condition.

In the fully inflated condition shown in FIG. 8, the front portion 70 of the air bag 14 is presented away from the instrument panel 36 and the front panel 72 is presented facing the vehicle seat 22. The top portion 90 extends along windshield 16 and occupies the space between the windshield and the instrument panel 36. The bottom portion 92 extends along the instrument panel 36 and projects from the instrument panel toward the vehicle seat 22. The untethered, inverted pocket 100 in the bottom portion 92 of the air bag 14 is positioned between the front portion 72 of the air bag 14 and the instrument panel 36. The position of the inverted pocket 100 when the air bag 14 is inflated is configured to correspond with the likely or expected position of the infant 28 within the car seat 26. More specifically, the inverted pocket 100 is configured to deploy around the infant 28 in the car seat 26, thereby placing the infant and/or the child car seat or a portion thereof within the uninflated volume 102 and between the inflated lobes 110.

Since the pocket 100 in the air bag 14 of FIG. 8 is untethered to the remainder of the air bag, the pocket begins to unfurl outward and away from the inflatable volume 54 as the air bag deploys, thereby reducing the size of the uninflated volume 102. The untethered pocket 100 expands outward toward the infant 28 until impacting the infant and/or car seat 26. When this occurs, the reduced material tension in the fabric forming the pocket 100 relative to the fabric forming the rest of the inflated air bag 14 causes the pocket to retain an inverted condition upon impacting the infant 28 and/or car seat 26. In other words, the reaction forces of the infant 28 and/or car seat 26 upon the reduced material tension pocket 100 are sufficient to prevent the pocket from fully expanding outward when impacting the infant and/or car seat.

Portions of the pocket 100 that do not impact the infant 28 or car seat 26 may fully unfurl around the infant and car seat, thereby turning inside out to define a second inflatable volume 103 that supplements the inflatable volume 102. The second inflatable volume 103 may be positioned between the car seat 26 and the instrument panel 36 and may therefore help to limit or prevent movement of the car seat towards the instrument panel 36.

The reduced tension in the area of the untethered, inverted pocket 100 thereby advantageously may help reduce the magnitude of impact forces with those areas during deployment. This reduced tension in the area of the untethered pocket 100 may help provide a reduced resistance to air bag penetration relative to the remainder of the inflated air bag 14. Those skilled in the art will appreciate that the material tension in the area of the untethered pocket 100 and, thus, the level of resistance to penetration of the pocket when the air bag 14 is inflated can be tailored or adjusted by altering the size and shape of the extensions 180 in the main panel 160 to adjust the radius of curvature of the pocket.

Figure 9:
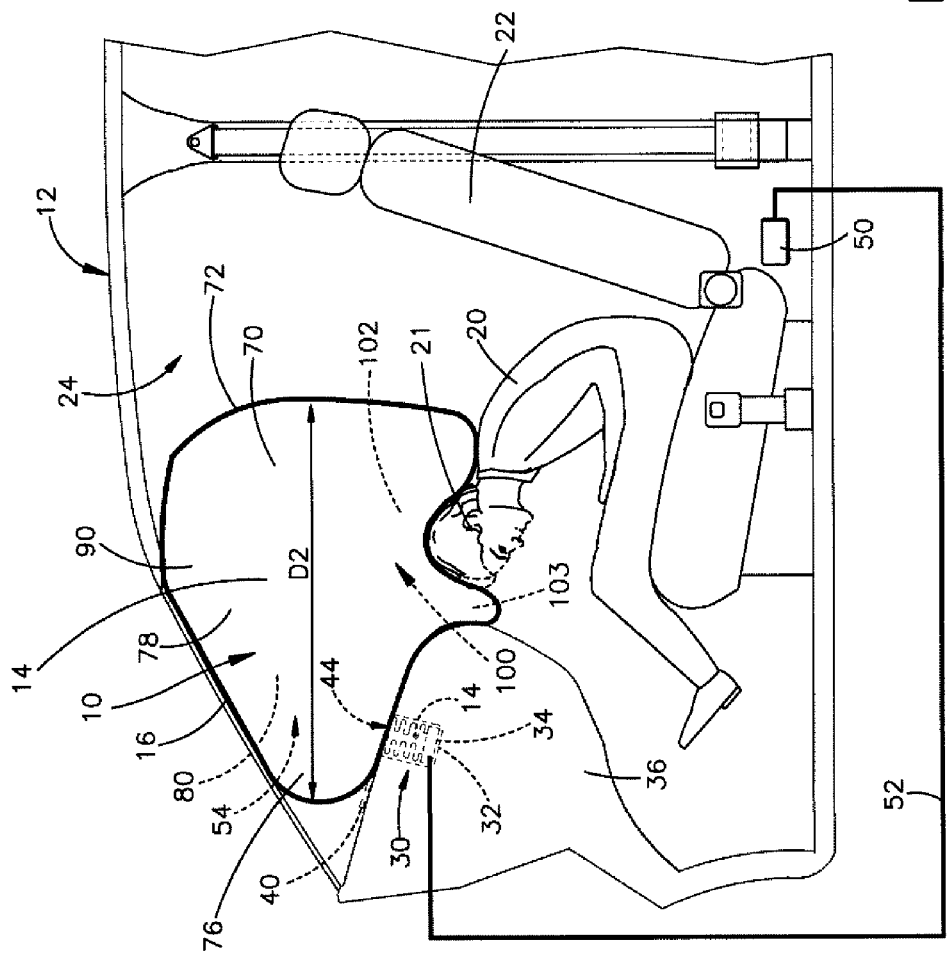
FIG. 9 is a schematic side view of the apparatus of FIG. 8 in which the occupant is seated in a seat of the vehicle and out-of-position.

FIG. 9 illustrates deployment of the air bag 14 of FIG. 8 when the vehicle seat 22 is occupied by an out-of-position occupant 20. In the fully inflated condition shown in FIG. 9, the position of the inverted pocket 100 when the air bag 14 is inflated is configured to correspond with the likely or expected position of the out-of-position occupant 20. More specifically, the inverted pocket 100 is configured to deploy around the out-of-position occupant 20, thereby placing the head 21 of the out-of-position occupant within the uninflated volume 102 and between the inflated lobes 110.

Since the pocket 100 in the air bag 14 of FIG. 9 is untethered to the remainder of the air bag, the pocket begins to unfurl outward and away from the inflatable volume 54 as the air bag deploys, thereby reducing the size of the uninflated volume 102. The untethered pocket 100 expands outward toward the out-of-position occupant 20 until impacting the out-of-position occupant. When this occurs, the reduced material tension in the fabric forming the pocket 100 relative to the fabric forming the rest of the inflated air bag 14 causes the pocket to retain an inverted condition upon impacting the out-of-position occupant 20. In other words, the reaction forces of the out-of-position occupant 20 upon the reduced material tension pocket 100 are sufficient to prevent the pocket from fully expanding outward when impacting the out-of-position occupant.

Portions of the pocket 100 that do not impact the out-of-position occupant 20 may fully unfurl around the out-of-position occupant, thereby turning inside out to define a second inflatable volume 103 that supplements the inflatable volume 102. The second inflatable volume 103 may be positioned between the out-of-position occupant 20 and the instrument panel 36 and may therefore help to limit or prevent movement of the out-of-position occupant towards the instrument panel 36.

The reduced tension in the area of the untethered, inverted pocket 100 advantageously may help reduce the magnitude of impact forces with those areas during deployment. This reduced tension in the area of the untethered pocket 100 may help provide a reduced resistance to air bag penetration relative to the remainder of the inflated air bag 14. Those skilled in the art will appreciate that the material tension in the area of the untethered pocket 100 and, thus, the level of resistance to penetration of the pocket when the air bag 14 is inflated can be tailored or adjusted by altering the size and shape of the extensions 180 in the main panel 160 to adjust the radius of curvature of the pocket.

When the out-of-position occupant 20 moves toward the inflated air bag 14, the occupant's head 21 penetrates the front panel 72 of the air bag nearer the bottom portion 92. The bottom portion 92 of the air bag 14 between the occupant's head 21 and the instrument panel 36 has a reduced volume compared to the remainder of the air bag. In particular, the depth of the bottom portion 92 of the air bag 14, indicated by D1, is less than the depth of the entire air bag between the front panel 72a and the rearmost edge, indicated by D2. The reduced inflation depth at the bottom portion 92 results in a reduced resistance to penetration by the occupant 20 compared to the resistance provided by the air bag 14 along its entire inflated depth. The penetrating occupant 20 thereby experiences reduced impact forces at the bottom portion 92 compared to impacting deeper inflated portions of the air bag 14a.

Furthermore, the second inflatable volume 103 provided by the inside-out portion of the pocket 100 helps to limit or prevent movement of the bottom portion 92 of the air bag 14 towards the instrument panel 36. The second inflatable volume 103 thereby acts as a reaction surface for the bottom portion 92 of the air bag 14 to help minimize reaction forces between the out-of-position occupant 20 and the instrument panel 36.

Figure 10:
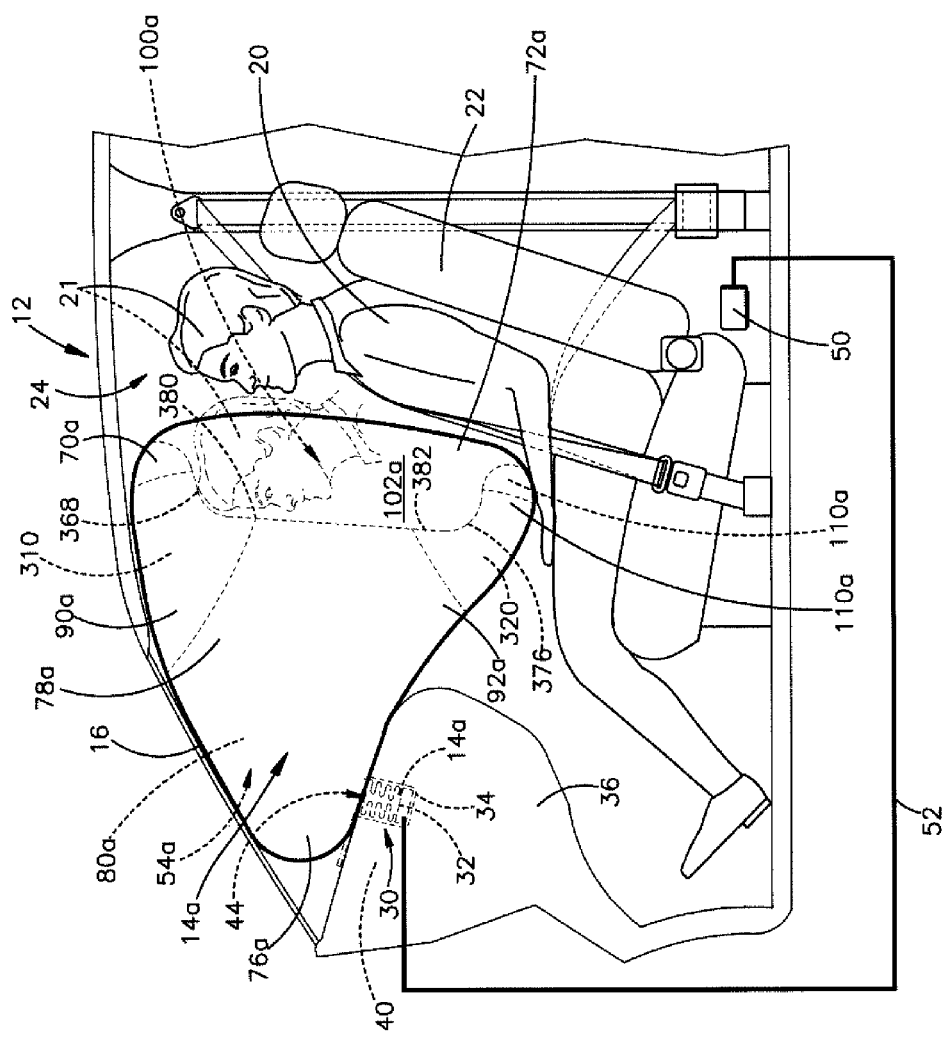
FIG. 10 is a schematic side view illustrating an apparatus for helping to protect an occupant of a vehicle an air bag having an uninflated pocket in accordance with another embodiment of the present invention.
Figure 11:
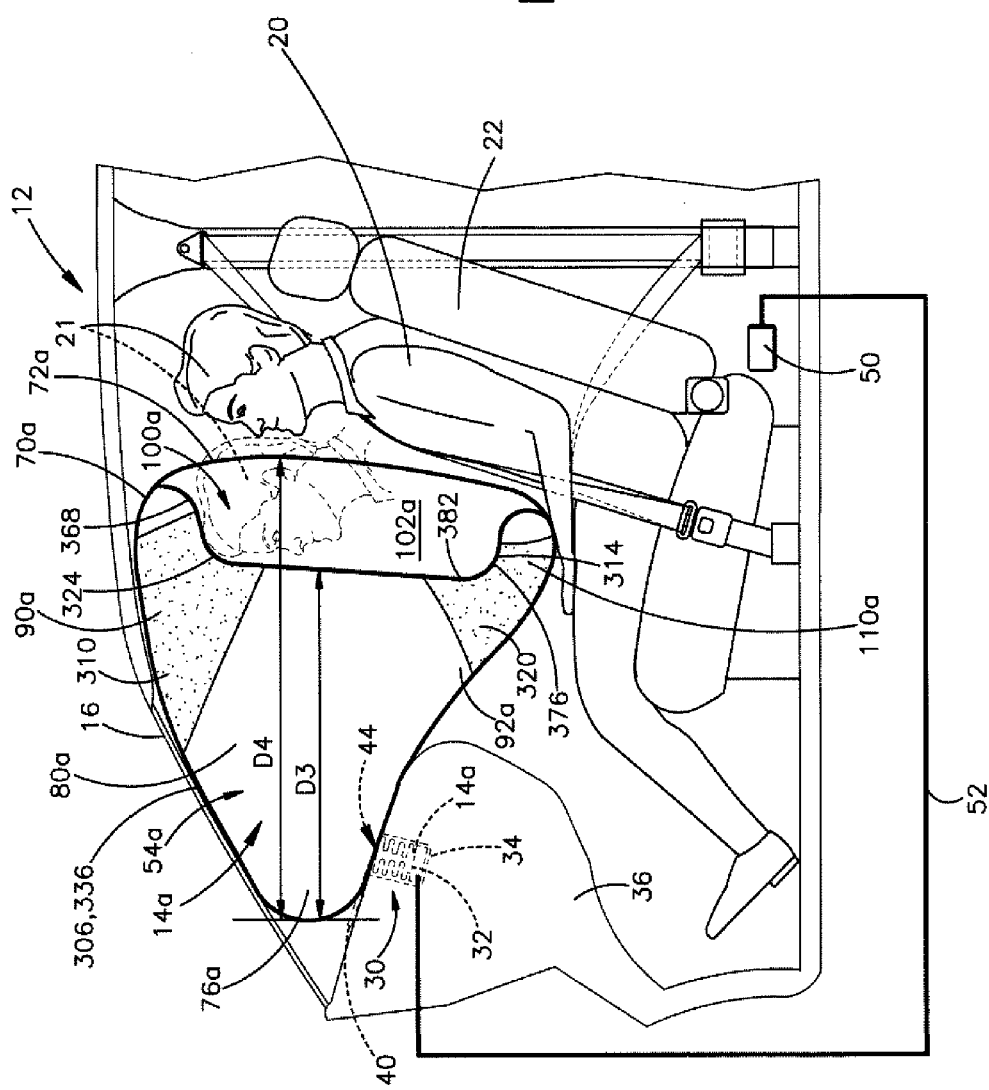
FIG. 11 is a side sectional view of FIG. 10.

In accordance with another embodiment of the present invention, the air bag 14a is a passenger frontal air bag for helping to protect an occupant 20 of the seat 22 on the passenger side 24 of the vehicle 12. Those skilled in the art will appreciate that the air bag 14a disclosed herein could be adapted for a driver side vehicle occupant (not shown). Such a construction of the air bag 14a is shown in FIGS. 10-11. Features in FIGS. 10-11 that are identical to features in FIGS. 1-7 are given identical reference numbers, whereas features in FIGS. 10-11 that are similar to features in FIGS. 1-7 are given reference numbers with the suffix "a".

As shown in FIGS. 10-11, the air bag 14a includes a front portion 70a, a rear portion 76a, a top portion 90a, a bottom portion 92a, and lateral portions 78a, 80a. Together, the portions 70a, 76a, 78a, 80a, 90a, 92a define the inflatable volume 54a of the air bag 14a. The air bag 14a further includes a pocket 100a that extends from the front portion 70a towards the rear portion 76a of the air bag. The pocket 100a defines an uninflated volume 102a for helping to protect the occupant 20 of the vehicle 12. The pocket 100a divides the front portion 70a of the air bag 14a into a pair of inflatable lobes 110a positioned on opposite sides of the pocket.

Figure 12:
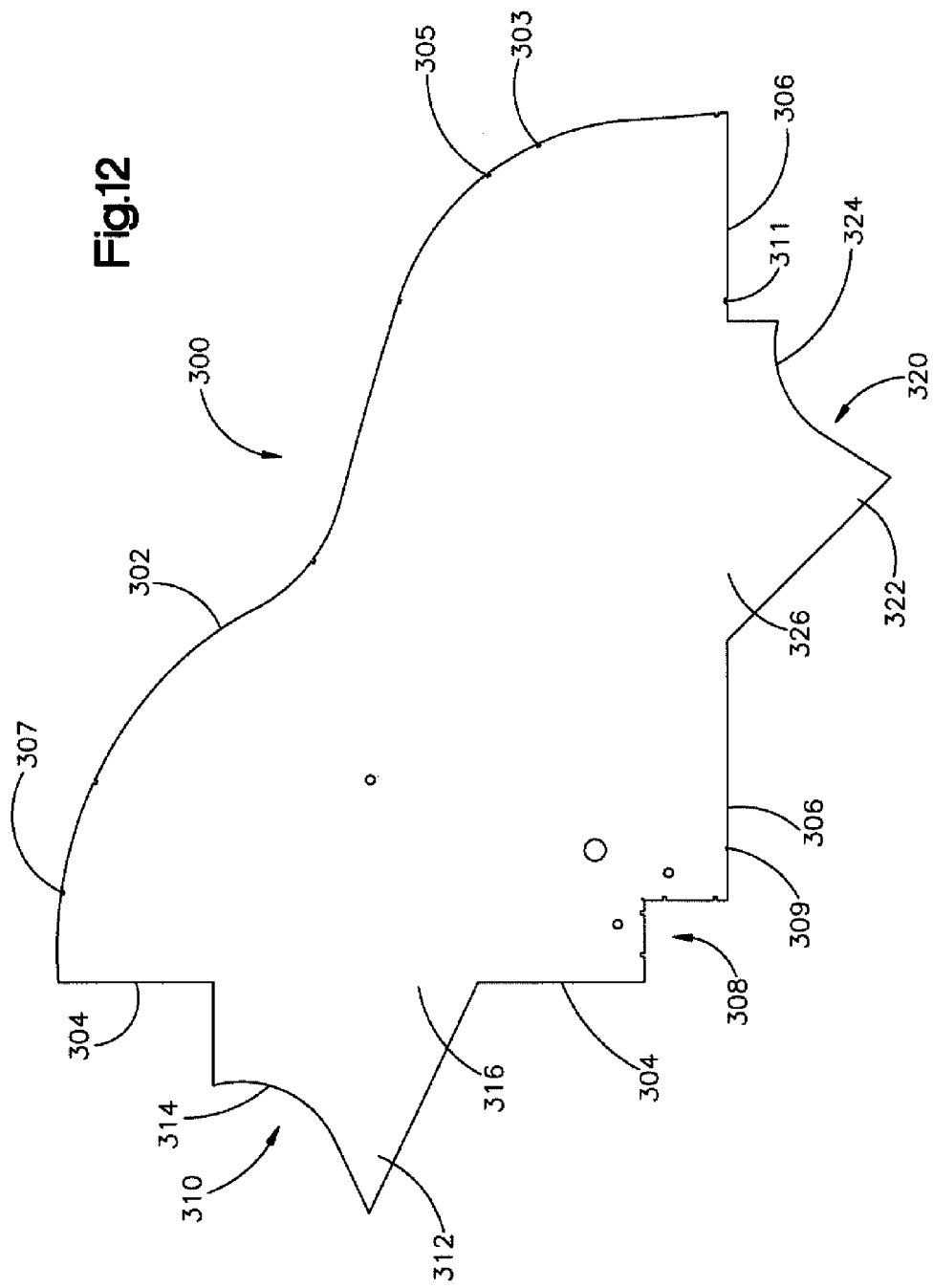
FIG. 12 is a schematic illustration of a first panel for constructing the air bag of FIG. 10.
Figure 13:
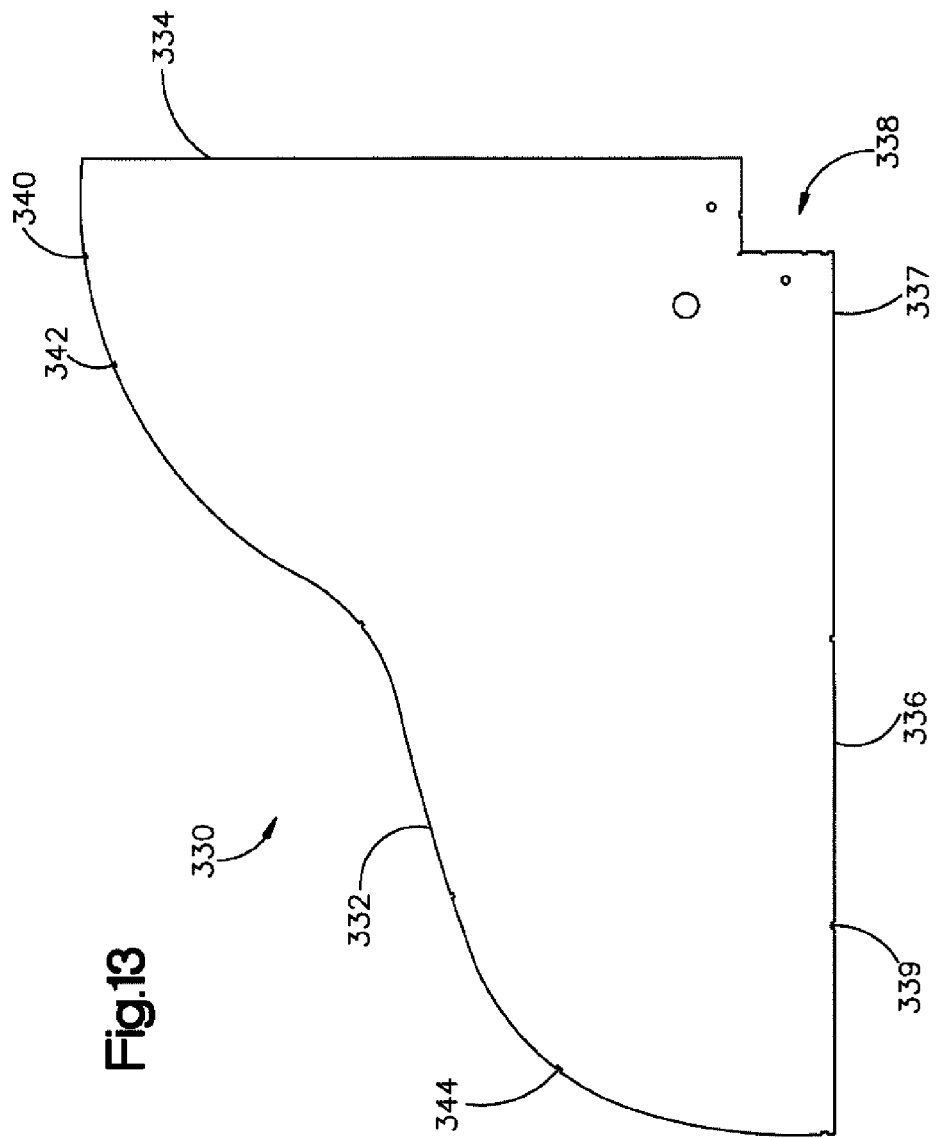
FIG. 13 is a schematic illustration of a second panel for constructing the air bag of FIG. 10.
Figure 14:
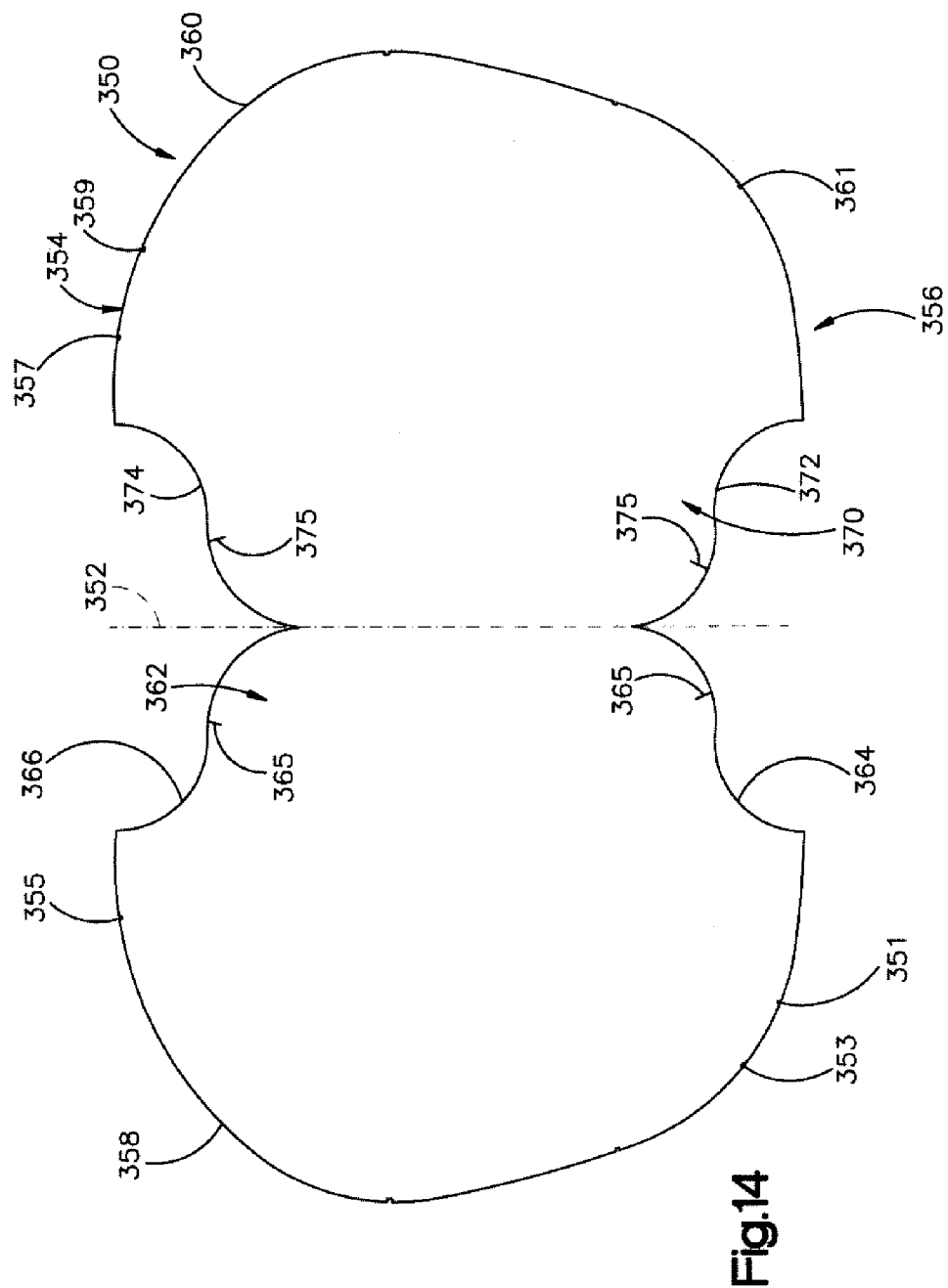
FIG. 14 is a schematic illustration of a third panel for constructing the air bag of FIG. 10.

FIGS. 12-14 illustrate plan views of component parts used to construct the air bag 14a in accordance with an embodiment of the present invention. The component parts of the air bag 14a include a first panel 300, a second panel 330, and a third panel 350 that are interconnected to define the inflatable volume 54a of the air bag. As shown in FIG. 12, the first panel 300 may be formed from one piece of material and has a substantially triangular shape defined by first, second, and third peripheral edges 302, 304, 306. The first peripheral edge 302 may have an arcuate contour and connects the second peripheral edge 304 to the third peripheral edge 306. The second and third peripheral edges 304, 306 extend substantially perpendicular to one another. The first panel 300 may also include various openings 308 for accommodating a connection with the air bag module 30, e.g., the housing 34 and/or the inflator 32.

The first and second peripheral edges 302, 306 include a series of notches for helping to assemble the air bag 14a. The first peripheral edge 302 includes a first notch 303 adjacent to the third peripheral edge 306, a second 305, and a final notch 307 adjacent to the second peripheral edge 304. A series of notches are arranged between the third notch 305 and the final notch 307 but are omitted for brevity. The third peripheral edge 306 includes a first notch 309 adjacent to the opening 308 and a second notch 311 positioned adjacent to the first peripheral edge 302.

The first panel 300 may include one or more tethers 310, 320 that extend from the first panel. As shown in FIG. 12, the first panel 300 includes a first tether 310 that extends from the second peripheral edge 304 and a second tether 320 that extends from the third peripheral edge 306. The first tether 310 and/or the second tether 320 may be secured to or integral with the second peripheral edge 304 and the third peripheral edge 306, respectively. The first tether 310 includes a first end portion 312 that extends away from the second peripheral edge 304 and a second end portion 316 connected to the second peripheral edge. The second tether 320 includes a first end portion 322 that extends away from the third peripheral edge 306 and a second end portion 326 connected to the third peripheral edge. The tethers 310, 320 may be positioned at opposite ends of the first panel 300 or may be positioned adjacent to one another (not shown).

As shown in FIG. 13, the second panel 330 may be formed from one piece of material and has a substantially triangular shape defined by first, second, and third peripheral edges 332, 334, 336. The first peripheral edge 332 may have an arcuate contour and connects the second peripheral edge 334 to the third peripheral edge 336. The second and third peripheral edges 334, 336 may extend substantially perpendicular to one another or may extend at another angle relative to one another. The second panel 330 may also include various openings 338 for accommodating a connection with the air bag module 30, e.g., the housing 34 and/or the inflator 32.

The first peripheral edge 332 includes a first notch 340 adjacent to the third peripheral edge 336, a second notch 342, and a final notch 344 adjacent to the second peripheral edge 334. A series of notches are arranged between the second notch 342 and the final notch 344 but are omitted for brevity. The third peripheral edge 336 includes a first notch 337 adjacent to the openings 338 and a second notch 339 adjacent to the first peripheral edge 339.

Although the first and second panels 300, 330 are illustrated as being separate panels of material, those skilled in the art will appreciate that the first and second panels could likewise be formed together as a single panel of material. For example, portions of first panel 300 adjacent to the openings 338, e.g., portions of the second and third peripheral edges 304, 306, may be configured and shaped to be integrally formed with portions of the second panel 330 adjacent to the openings 338, e.g., portions of the second and third peripheral edges 334, 336, such that the first and second panels may be formed as a single piece of material (not shown).

As shown in FIG. 14, the third panel 350 has a generally round shape and forms the front panel 72a of the air bag 14a. The third panel 350 may be formed as one piece of material and extends along a centerline 352 from a first end portion 354 to a second end portion 356. The third panel 350 includes a first peripheral edge 358 and a second peripheral edge 360 connected to the first peripheral edge. The first and second peripheral edges 358, 360 are symmetric about the centerline 352 and are each spaced from the centerline.

One or more extensions 362 of material extend from the first peripheral edge 358 and away from the first peripheral edge. One or more extensions 370 of material likewise extend from the second peripheral edge 360 and away from the second peripheral edge. As shown in FIG. 14, a single extension 362 extends from the first peripheral edge 358 and a single extension 370 extends from the second peripheral edge 360. Each extension 362, 370 has an arcuate or semicircular contour, although the extensions may have alternative shapes, such as square, triangular, rectangular or the like. The extensions 362, 370 are symmetrically positioned on opposing sides of the centerline 352. The extensions 362, 370 may intersect at the centerline 352 or may be spaced from one another relative to the centerline (not shown).

The first peripheral edge 358 includes a first notch 351 adjacent to the extension 362, a second notch 353, and a final notch 355 adjacent to the extension 362. A series of notches are arranged between the second notch 353 and the final notch 355 but are omitted for brevity. The second peripheral edge 360 includes a first notch 357 adjacent to the extension 370, a second notch 359, and a final notch 361 adjacent to the extension 370. A series of notches are arranged between the second notch 359 and the final notch 361 but are omitted for brevity.

To assemble the air bag 14a, the second peripheral edge 304 of the first panel 300 is secured to the second peripheral edge 334 of the second panel 330 along a seam (not shown) and the third peripheral edge 306 of the first panel is secured to the third peripheral edge 336 of the second panel along a seam (not shown). In particular, the first and second notches 337, 339 on the second peripheral edge 336 of the second panel 330 are aligned with the first and second notches 309, 311, respectively, of the second peripheral edge 306 of the first panel 300. The seam (not shown) then secures the entire second peripheral edge 336 of the second panel 330 to the entire second peripheral edge 306 of the first panel 300.

The extensions 362, 370 on the third panel 350 are folded relative to the remainder of the third panel such that the extensions overlie one another. In other words, the extensions 362, 370 are inverted relative to the remainder of the third panel 350. In particular, the third panel 350 is folded such that the first peripheral edges 364, 372 are aligned with one another and the second peripheral edges 366, 374 are aligned with one another. The first peripheral edge 364 of the extension 362 is secured to the first peripheral edge 372 of the extension 370 along a seam 368 (FIG. 11). Alignment markers 365 on the extension 362 are aligned with alignment markers 375 on the extension 370 to properly position the extensions in an overlying manner.

The second peripheral edge 366 of the extension 362 is likewise secured to the second peripheral edge 374 of the extension 370 along a seam 376. The extensions 362, 370 are thereby interconnected along separate, spaced-apart seams 368, 376. Together, the interconnected extensions 362, 370 form the pocket 100a.

The first peripheral edge 358 of the third panel 350 is secured to the first peripheral edge 302 of the first panel 300 along a seam (not shown) and the second peripheral edge 360 of the third panel is secured to the first peripheral edge 332 of the second panel 330 along a seam (not shown). In particular, the first, second, and final notches 303, 305, 307 on the first peripheral edge 302 of the first panel 300 are aligned with the first, second, and final notches 351, 353, 355 respectively, of the first peripheral edge 358 of the third panel 350. The seam (not shown) then secures the entire first peripheral edge 358 of the third panel 350 to the entire first peripheral edge 302 of the first panel 300.

The first, second, and final notches 340, 342, 344 on the first peripheral edge 332 of the second panel 330 are aligned with the first, second, and final notches 357, 359, 361 respectively, of the second peripheral edge 360 of the third panel 350. The seam (not shown) then secures the entire second peripheral edge 360 of the third panel 350 to the entire first peripheral edge 332 of the second panel 330.

Next, the interconnected first peripheral edges 364, 372 of the extensions 362, 370 are secured to the edge 324 of the first end portion 322 of the tether 320 on the first panel 300 along a seam 380. The interconnected second peripheral edges 366, 374 of the extensions 362, 370 are secured to the edge 314 of the first end portion 314 of the tether 310 on the first panel 300 along a seam 382. Securing the first, second, and third panels 300, 330, 350 together forms and defines the front portion 70a, the rear portion 76a, the lateral portions 78a, 80a, the top portion 90a, and the bottom portion 92a of the air bag 14a.

The first, second, and third panels 300, 330, 350, when secured together, also cooperate to define the inflatable volume 54a of the air bag 14a.

The first, second, and third panels 300, 330, 350 are secured to one another such that the pocket 100a and the tethers 310, 320 extend inward toward the inflatable volume 54a of the air bag 14a. When the air bag 14a is inflated, the pocket extends away from the front panel 72a of the air bag towards the rear portion 76a to define the uninflated volume 102a that is positioned outside the inflatable volume 54a of the air bag. In other words, the pocket 100a is inverted relative to the front panel 72a towards the rear portion 76a of the air bag 14a.

The tethers 310, 320 act on the pocket 100a, i.e., the interconnected extensions 362, 370, such that the size of the uninflated volume 102a remains substantially constant during inflation of the air bag 14a. Alternatively or additionally, the tethers 310, 320 may act on the pocket 100a to help maintain the uninflated volume 102a at or above a predetermined volume when the air bag 14a inflates. The tethers 310, 320 may, for example, extend between the pocket 100a and the rear portion 76a of the air bag 14a.

Upon sensing the occurrence of an event for which inflation of the air bag 14a is desired, such as a vehicle collision, the sensor 50 provides a signal to the inflator 32 via the lead wires 52. Upon receiving the signal from the sensor 50, the inflator 32 is actuated and provides inflation fluid to the inflatable volume 54a of the air bag 14a in a known manner. The inflating air bag 14a exerts a force on the door 40, which moves the door to the opened condition. The air bag 14a inflates from the stored condition to a deployed condition, such as the fully inflated, deployed, and pressurized condition illustrated in solid lines in FIG. 10. The air bag 14a, when inflated, helps protect the vehicle occupant 20 from impacts with parts of the vehicle 12, such as the instrument panel 36.

In the fully inflated condition shown in FIGS. 10-11, the front portion 70a of the air bag 14a is positioned away from the instrument panel 36 and the front panel 72a is presented facing the vehicle seat 22. The top portion 90a extends along the windshield 16 and occupies the space between the windshield and the instrument panel 36. The bottom portion 92a extends along the instrument panel 36 and projects from the instrument panel toward the vehicle seat 22.

The pocket 100a extends from the front portion 72a of the air bag 14a towards the rear portion 76a. The position of the pocket 100a when the air bag 14a is inflated is configured to correspond with the likely or expected position of the head 21 of the occupant 20 when normally positioned on the seat 22. More specifically, the pocket 100a is configured to deploy to a position that is aligned with the head 21 of the normally positioned occupant 20 such that movement of the occupant towards the instrument panel 36 during a vehicle crash results in the occupant's head initially moving into the uninflated space 102a of the pocket 100a rather that engaging either of the inflated lobes 110a on either side of the uninflated space.

As the air bag 14a deploys toward the occupant 20, the first end portion 322 of the tether 320, being secured to the first peripheral edges 364, 372 of the pocket 100a, and the first end portion 312 of the tether 310, being secured to the second peripheral edges 366, 374 of the pocket, move away from the instrument panel and toward the occupant 20. Since the second end portions 316, 326 of the tethers 310, 320 are secured to the rear portion 76a adjacent to the instrument panel 36 the tethers provide resistance to movement of the pocket 100a out of the inverted condition shown in FIGS. 10-11 and thus helps maintain the size, position, and orientation of the pocket.

As shown in FIG. 10, when the air bag 14a deploys, the pocket 100a is configured to extend in a substantially vertical direction along the front portion 70a of the air bag between the top portion 90a and the bottom portion 92a. Those skilled in the art will appreciate that the pocket 100a may alternatively be configured to extend at an angle relative to the front portion 70a and between the lateral portions 78a, 80a of the air bag (not shown) in accordance with the present invention.

When the normally seated belted or unbelted occupant 20 moves toward the inflated air bag 14a, the occupant's head 21 enters into the uninflated volume 102a of the pocket 100a rather than penetrating the inflated lobes 110a of the air bag. The portion of the air bag 14a between the pocket 100a and the instrument panel 36 has a reduced volume compared to the remainder of the air bag, e.g., the volume of the inflated lobes 110a. In particular, the depth of the air bag 14a from the pocket 100a to the rearmost edge of the air bag, indicated by D3, is less than the depth of the entire air bag between the front panel 72a and the rearmost edge, indicated by D4. The reduced inflation depth at the pocket 100a results in a reduced resistance to penetration by the occupant 20 compared to the resistance provided by the air bag 14a along its entire inflated depth. The penetrating occupant 20 thereby experiences reduced impact forces at the pocket 100a compared to impacting deeper inflated portions, e.g., the lobes 110a, of the air bag 14a.

As with the pocket 100, due to the configuration of the pocket 100a and, more specifically the extra material provided by the tethers 310, 320 and the extensions 362, 372 of the third panel 350, the pocket is maintained in the desired position relative to the vehicle seat 22 and to an occupant 20 that may be positioned on the vehicle seat. Advantageously, the tethers 310, 320 can help ensure that the areas of the air bag 14 in the area of the pocket 100a have a reduced resistance to penetration and thereby can produce softer impact forces with the air bag during deployment. Furthermore, as with the pocket 100, the pocket 100a forms a portion of the air bag 14a that has a smaller radius of curvature than the rest of the air bag. Accordingly, the fabric forming the pocket 100a, i.e., the extensions 362, 370, experiences reduced stress relative to the rest of the inflated air bag 14a, thereby helping to provide a reduced fabric tension within the pocket that may help to reduce resistance to air bag penetration relative to the remainder of the inflated air bag.

FIG. 15 illustrates an alternative construction of the air bag 14a in which the tethers 310, 320 are omitted from the first panel 300. In this configuration, the first, second and third panels 300, 330, 350 are secured together in the manner described with the exception that the interconnected first peripheral edges 364, 372 and interconnected second peripheral edges 366, 374 of the extensions 362, 370 are not secured to another portion of the air bag 14a. The pocket 100a is formed and inverted by interconnecting the extensions 362, 370 on the third panel 350. The air bag 14a is then stored with the untethered pocket 100a in the inverted condition.

In the fully inflated condition shown in FIG. 15, the front portion 70a of the air bag 14a is positioned away from the instrument panel 36 and the front panel 72a is presented facing the vehicle seat 22. The top portion 90a extends along the windshield 16 and occupies the space between the windshield and the instrument panel 36. The bottom portion 92a extends along the instrument panel 36 and projects from the instrument panel toward the vehicle seat 22.

The untethered, inverted pocket 100a extends from the front portion 72a of the air bag 14a towards the rear portion 76a. The position of the untethered pocket 100a when the air bag 14a is inflated is configured to correspond with the likely or expected position of the head 21 of the occupant 20 when normally positioned on the seat 22. As shown in FIG. 15, when the air bag 14a deploys, the untethered pocket 100a is configured to extend in a substantially vertical direction along the front portion 70a of the air bag between the top portion 90a and the bottom portion 92a. Those skilled in the art will appreciate that the untethered pocket 100a may alternatively be configured to extend at an angle relative to the front portion 70a and between the lateral portions 78a, 80a of the air bag (not shown) in accordance with the present invention.

When the normally seated belted or unbelted occupant 20 moves toward the inflated air bag 14a, the occupant's head 21 enters into the uninflated volume 102a of the pocket 100a rather than penetrating the inflated lobes 110a of the air bag. Simultaneously, since the pocket 100a in the air bag 14a of FIG. 15 is untethered to the remainder of the air bag, the pocket begins to unfurl outward and away from the inflatable volume 54a as the air bag deploys, thereby reducing the size of the uninflated volume 102a. The untethered pocket 100a expands outward toward the penetrating occupant 20 until impacting the occupant. When this occurs, the reduced material tension in the fabric forming the pocket 100a relative to the fabric forming the rest of the inflated air bag 14a causes the pocket to retain an inverted condition upon impacting the occupant 20. In other words, the reaction forces of the penetrating occupant 20 upon the reduced material tension pocket 100a are sufficient to prevent the pocket from fully expanding outward when impacting the occupant. The penetrating occupant 20 thereby experiences reduced impact forces at the untethered pocket 100a compared to impacting deeper inflated portions, e.g., the lobes 110a, of the air bag 14a. Portions of the pocket 100a that do not impact the occupant 20 may fully unfurl, i.e., turn inside out, around portions of the occupant, thereby forming a second inflatable volume 103 that supplements the inflatable volume 54a of the air bag 14a.

As with the untethered pocket 100, the untethered pocket 100a forms a portion of the air bag 14a that has a smaller radius of curvature than the rest of the air bag. Accordingly, the fabric forming the untethered pocket 100a, i.e., the extensions 362, 370, experiences reduced stress relative to the rest of the inflated air bag 14a, thereby helping to provide a reduced fabric tension within the pocket that may help to reduce resistance to air bag penetration relative to the remainder of the inflated air bag.

Although the air bag 14a of the present invention has been described as having a particular construction, those skilled in the art will appreciate that modifications to the air bag can be made without deviating from the spirit of the invention. The size, shape, number, and configuration of the extensions 362, 370 may be configured to form a pocket 100a and, thus, a particular uninflated volume 102a that has a particular configuration, e.g., size, shape, and orientation, in order to meet desired performance criteria. For example, the tethers 310, 320 may be configured to be secured to any one or more portions 70a, 72a, 76a, 78a, 80a, 90a, 92a of the air bag 14a. In particular, each tether 310, 320 may be secured to one of the lateral portions 78a, 80a of the air bag 14a. The tethers 310, 320 may also exhibit alternative shapes other than triangular, such as square, rectangular, arcuate, etc. Regardless of whether the air bag 14a includes tethers 310, 320, the extensions 362, 370 may be configured to exhibit a shape other than arcuate such as square, triangular, rectangular or the like.

From the above description of the invention, those skilled in the art will perceive improvements, changes and modifica- Having described the invention, the following is claimed:

1. An inflatable vehicle occupant protection device for being inflated between an instrument panel and a seat of a vehicle, the protection device comprising:
   a main panel comprising first peripheral edge and a second peripheral edge, the first peripheral edge having a generally downward curved configuration with opposite ends that intersect opposite ends of the second peripheral edge, the main panel further comprising downwardly extending extensions spaced laterally from one another along the second peripheral edge, the main panel being folded over such that the extensions and the intersections of the opposite ends overlie each other, wherein overlying portions of the second peripheral edge are interconnected, the interconnection extending from overlying portions of the second peripheral edge adjacent the fold to the overlying intersections of the opposite ends; and
   a front panel having a periphery interconnected along the first peripheral edge of the main panel, the periphery having a length that corresponds to a length of the first peripheral edge such that interconnection of the periphery to the main panel begins at a predetermined location on the periphery of the front panel, extends around the entire periphery of the front panel, and ends at the predetermined location on the periphery;
   the interconnection of the overlying portions of the second peripheral edge and the interconnection of the main panel to the front panel closing an inflatable volume defined by the main panel and the front panel, wherein the interconnected extensions are inverted into the inflatable volume to define a pocket, the interconnected extensions being connected to the front panel within the inflatable volume to maintain their inverted configuration and the configuration of the pocket.

2. The inflatable vehicle occupant protection device recited in claim 1, wherein the main panel and the front panel are interconnected to define:
   a front portion having a panel presented towards the vehicle seat;
   a rear portion adjacent the instrument panel;
   top and bottom portions interconnecting the front portion and the rear portion to define an inflatable volume.

3. The inflatable vehicle occupant protection device recited in claim 2, wherein the pocket extends from the rear portion towards the front portion and terminates prior to the front portion.

4. The inflatable vehicle occupant protection device recited in claim 2, wherein the extensions are arcuate.

5. The inflatable vehicle occupant protection device recited in claim 2, wherein when the protection device is inflated the pocket has a first material tension that provides a first resistance to occupant penetration and a remainder of the protection device has a second, higher material tension that provides a second resistance to occupant penetration that is greater than the first resistance.

6. The inflatable vehicle occupant protection device recited in claim 2, wherein the pocket is spaced entirely from the top portion.

7. The inflatable vehicle occupant protection device recited in claim 2, wherein the main panel extends from a first end portion to a second end portion, the extensions extending from the second end portion away from the first end portion prior to being interconnected.

8. The inflatable vehicle occupant protection device recited in claim 7, the interconnected extensions having an inverted condition extending towards the first end portion to form the pocket.

9. The inflatable vehicle occupant protection device recited in claim 2 further comprising a tether having a first end portion secured to the pocket and a second end portion secured to a portion of the protection device such that a size of the uninflated volume remains larger than a predetermined amount when the protection device is inflated.

10. The inflatable vehicle occupant protection device recited in claim 9, wherein the second end portion of the tether is secured to the top portion of the protection device.

11. The inflatable vehicle occupant protection device recited in claim 9, wherein the second end portion of the tether is secured to the panel of the front portion of the protection device.

* * * * *